(12) United States Patent
Moeker

(10) Patent No.: US 11,052,866 B2
(45) Date of Patent: Jul. 6, 2021

(54) SAFETY BELT DEVICE FOR A VEHICLE

(71) Applicant: Volkswagen Aktiengesellschaft, Wolfsburg (DE)

(72) Inventor: Carsten Moeker, Ruehen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 21 days.

(21) Appl. No.: 16/725,797

(22) Filed: Dec. 23, 2019

(65) Prior Publication Data

US 2020/0130636 A1  Apr. 30, 2020

Related U.S. Application Data

(63) Continuation of application No. PCT/EP2018/066741, filed on Jun. 22, 2018.

(30) Foreign Application Priority Data

Jun. 22, 2017  (DE) ..................... 10 2017 210 465.1

(51) Int. Cl.
*B60R 22/195* (2006.01)
*B60R 22/26* (2006.01)
*B60R 22/18* (2006.01)
*B60R 22/28* (2006.01)

(52) U.S. Cl.
CPC .......... *B60R 22/1952* (2013.01); *B60R 22/26* (2013.01); *B60R 2022/1806* (2013.01); *B60R 2022/281* (2013.01)

(58) Field of Classification Search
CPC .............. B60R 22/195; B60R 22/1951; B60R 22/1952; B60R 22/1953; B60R 2022/1806; B60R 2022/281
See application file for complete search history.

(56) References Cited

U.S. PATENT DOCUMENTS

| 5,104,193 | A | * | 4/1992 | Fohl | ..................... B60R 22/1952 |
| | | | | | 297/480 |
| 5,725,249 | A | * | 3/1998 | Nishide | ............... B60R 22/1952 |
| | | | | | 280/806 |
| 8,733,795 | B2 | | 5/2014 | Kim et al. | |

(Continued)

FOREIGN PATENT DOCUMENTS

| DE | 1430422 A1 | 11/1968 |
| DE | 2006402 | 9/1971 |

(Continued)

*Primary Examiner* — James A English
*Assistant Examiner* — Mary E Young
(74) *Attorney, Agent, or Firm* — Muncy, Geissler, Olds & Lowe, P.C.

(57) ABSTRACT

A safety belt device for a vehicle, having a belt force limiting unit and a safety belt buckle that interacts therewith, through which buckle a wire cable loop is passed that transitions into wire cable segments that are passed out of the safety belt buckle and extend to a cable deflection element at which they are deflected about at least one deflection axis in the direction toward the belt force limiting unit, wherein the safety belt buckle is rotated about a safety belt buckle axis such that the wire cable loop passed through the safety belt buckle is oriented with its loop opening open in the axial direction with respect to the deflection axis.

7 Claims, 5 Drawing Sheets

(56) References Cited

U.S. PATENT DOCUMENTS

| | | | | |
|---|---|---|---|---|
| 2003/0090100 | A1* | 5/2003 | Webber | B60R 22/1952 |
| | | | | 280/806 |
| 2004/0212188 | A1 | 10/2004 | Terasaki | |
| 2013/0299620 | A1* | 11/2013 | Miyoshi | B60R 22/1952 |
| | | | | 242/374 |
| 2015/0008718 | A1* | 1/2015 | Inagawa | B60R 22/18 |
| | | | | 297/480 |
| 2018/0105134 | A1* | 4/2018 | Kim | B60R 22/1955 |
| 2019/0351866 | A1* | 11/2019 | Betz | B60R 22/28 |

FOREIGN PATENT DOCUMENTS

| | | | |
|---|---|---|---|
| DE | 2314022 | A1 | 10/1974 |
| DE | 2540636 | A1 | 3/1977 |
| DE | 3237680 | A1 | 4/1984 |
| DE | 3446864 | A1 | 9/1986 |
| DE | 19806000 | A1 | 8/1999 |
| DE | 19927513 | A1 | 1/2001 |
| DE | 20209284 | U1 | 10/2003 |
| DE | 102005060913 | A1 | 6/2007 |
| DE | 102007033154 | A1 | 4/2008 |
| DE | 102007025436 | A1 | 12/2008 |
| DE | 102011109565 | A1 | 2/2013 |
| DE | 102012112223 | A1 | 3/2014 |
| JP | H0867232 | A | 3/1996 |

\* cited by examiner

SAFETY BELT DEVICE FOR A VEHICLE

This nonprovisional application is a continuation of International Application No. PCT/EP2018/066741, which was filed on Jun. 22, 2018, and which claims priority to German Patent Application No. 10 2017 210 465.1, which was filed in Germany on Jun. 22, 2017, and which are both herein incorporated by reference.

BACKGROUND OF THE INVENTION

Field of the Invention

The present invention relates to a safety belt device for a vehicle.

Description of the Background Art

A safety belt device can, by way of example, have a three-point safety belt formed of a lap belt portion and a shoulder belt portion, and have a belt retractor on whose belt reel the safety belt can be wound. When a vehicle occupant's safety belt is fastened, in the event of vehicle deceleration caused by an accident the winding drum of the belt retractor is locked with the aid of a locking device installed therein in order to prevent an extension of the belt. As a result, a safety-belt force acts on the vehicle occupant. In order to limit the safety-belt force acting on the vehicle occupant, a belt force limiting unit can be provided, by means of which the safety-belt force exerted on the vehicle occupant is limited to a predefined force level.

A generic safety belt device has such a belt force limiting unit and a safety belt buckle interacting therewith, through which buckle a wire cable loop is passed. The latter transitions into wire cable segments that are passed out of the safety belt buckle and extend to a cable deflection element. At the cable deflection element, the wire cable segments are deflected about a deflection axis in the direction toward the belt force limiting unit. In view of a space-efficient arrangement, the safety belt buckle is rotated about a safety belt buckle axis, specifically in such a manner that the wire cable loop passed through the safety belt buckle is oriented with its loop opening open in the axial direction with respect to the deflection axis. In the cable deflection element, the wire cable segment facing toward the belt force limiting unit is deflected at a first cable pulley while the wire cable segment facing away from the belt force limiting unit is deflected at a second cable pulley, which is arranged at an offset from the first cable pulley in the axial direction of the deflection axis. The two cable pulleys are oriented coaxially to one another in the axial direction and are designed with identical outer diameters.

In a belt force limiting event, the safety belt buckle is subjected to a safety-belt force that acts upward, while the wire cable segments exert tensile forces in the opposite direction on the safety belt buckle. In the above-described constellation, the tensile forces acting in the wire cable segments exert a torsional moment on the safety belt buckle that acts in opposition to the above safety belt buckle rotation about the safety belt buckle axis. In the event of such a torsion-induced safety belt buckle rotation, there is a risk that the routing of the lap belt portion is adversely affected in the belt force limiting event, which is to say in the event of a crash.

From DE 32 37 680 A1, which is incorporated herein by reference, a three-point safety belt arrangement is known in which a first end of the safety belt is retained so as to be adjustable at least in height and the other end of the safety belt is connected to the first end of the safety belt in the manner of a block and tackle device.

SUMMARY OF THE INVENTION

It is therefore an object of the present invention to provide a safety belt device whose functionality in a belt force limiting event, which is to say, for example, in the event of a crash, is improved in a simple manner.

The essence of the invention is based on the following finding: In the above-described safety belt device, the wire cable segments passed out of the safety belt buckle thus extend over a wire cable path to the cable deflection element and in the process span a loop angle. The loop angle determines the orientation of the force action lines that run in the wire cable segments in the belt force limiting event. Reducing the loop angle makes it possible to efficaciously reduce the force components that act in the wire cable segments and cause the torsional moment. Against this background, in an exemplary embodiment, measures are provided for the purpose of reducing the loop angle defined above and thereby to reduce the torsional moment acting on the safety belt buckle in the belt force limiting event. For the purpose of reducing the torsional moment, the first deflection contour for deflection of the wire cable segment facing toward the belt force limiting unit is offset with respect to the second deflection contour in the direction toward the belt force limiting unit by an offset dimension. In this way, the loop angle between the two wire cable segments passed out of the safety belt buckle is reduced, which leads to a reduction of the torsional moment.

According to the invention, therefore, the loop angle is reduced by the deflection contour arrangement that is offset by the offset dimension, namely in comparison with deflection contours arranged without an offset. Through reduction of the loop angle, the force components that act in the wire cable segments and cause the torsional moment are of necessity also reducible.

The first and second deflection contour can each be designed as cable pulleys that are coaxially oriented in the axial direction. Depending on the design of the safety belt device, the two cable pulleys can be arranged parallel to the axis in the axial direction of the deflection axis and/or can have different outer diameters. It is preferred with regard to simple construction when the two cable pulleys are oriented coaxially to one another in the axial direction and, in addition, the first cable pulley for deflection of the wire cable segment facing toward the belt force limiting unit has a reduced outer diameter around which the wire cable segments are passed in comparison with the second cable pulley.

In common practice, the safety belt buckle with the wire cable loop carried therein is rotated by approximately 90° about the safety belt buckle axis, and specifically with respect to a safety belt buckle position in which the loop opening is oriented to be open at approximately right angles to the deflection axis and the wire cable segments extend with no twist from the safety belt buckle to the cable deflection element.

The belt force limiting unit installed in the safety belt device can preferably be implemented as a space-efficient piston-cylinder arrangement that is constructed of a piston tube and a piston that is displaceable with widening and plastic deformation of the piston tube in the belt force limiting event. In this way, the safety-belt force exerted on the vehicle occupant is limited to a predefined force level in the belt force limiting event (which is to say in the event of a crash).

The torsional moment acting on the safety belt buckle in the belt force limiting event can also be reduced as follows: The safety belt device can thus have a load-bearing cable guide along the wire cable path between the safety belt buckle and the cable deflection element. By means of the load-bearing cable guide, the wire cable segment facing toward the belt force limiting unit can be pressed in the direction toward the belt force limiting unit with a reduction of the loop angle. Alternatively and/or in addition, the load-bearing cable guide can press the wire cable segment facing away from the belt force limiting unit in the direction away from the belt force limiting unit, namely likewise with a reduction of the loop angle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
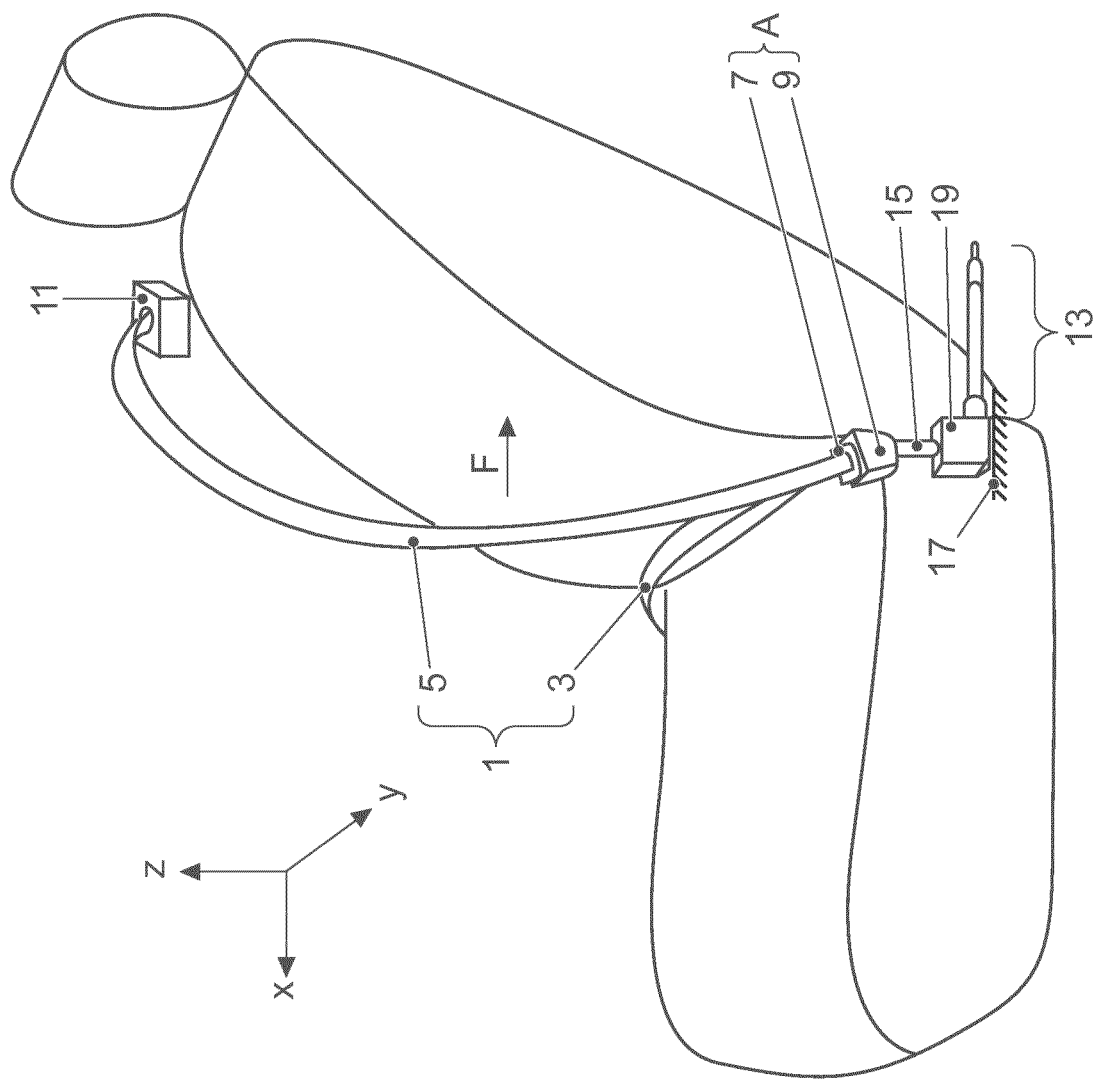
FIG. 1 is a perspective representation, a safety belt device with safety belt fastened, but omitting the vehicle occupant.

Shown in FIG. 1 is a vehicle seat with associated safety belt device whose safety belt 1 is represented in the fastened state but without vehicle occupant. Accordingly, a lap belt portion 3 of the safety belt 1 extends in the transverse vehicle direction y between an inner vehicle attachment point and an outer vehicle attachment point A. The inner vehicle attachment point A at lap height is designed to be detachable, specifically with a latch plate 7 attached to the safety belt 1 and with a safety belt buckle 9 interacting therewith that is fixed to the vehicle and into which the latch plate 7 is inserted. A third outer vehicle attachment point is located at approximately shoulder height. In common practice this attachment point is implemented by a deflection fitting, which is installed on a vehicle pillar and around which the shoulder belt portion 5 is passed to a belt retractor 11 that is built into the vehicle pillar and in which the safety belt 1 can be wound on a winding drum. In common practice, the belt retractor 11 has a locking unit. When a vehicle occupant's safety belt 1 is fastened, in the event of vehicle deceleration caused by an accident the winding drum of the belt retractor 11 is locked with the aid of the locking unit in order to prevent an extension of the belt. As a result, a safety-belt force F (FIG. 1) from the safety belt 1 acts on the vehicle occupant. If the safety-belt force F exceeds a predefined limit value, then a belt force limiting unit 13 becomes active, by means of which the safety-belt force F exerted on the vehicle occupant can be limited to a predefined force level.

Figure 2:
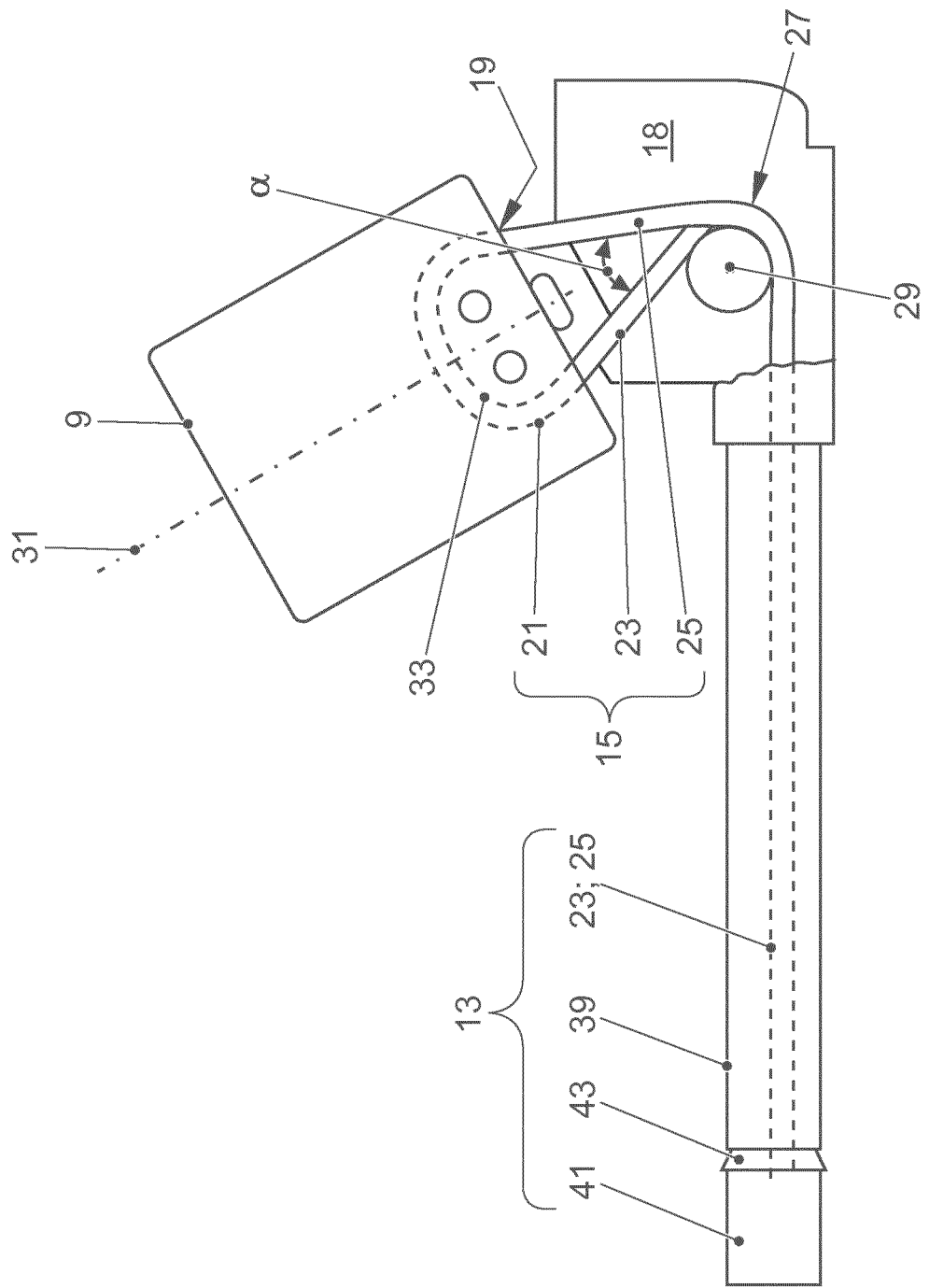
FIG. 2 is an assembly, formed of the safety belt buckle of the safety belt device and a force limiting unit, in isolation.
Figure 3:
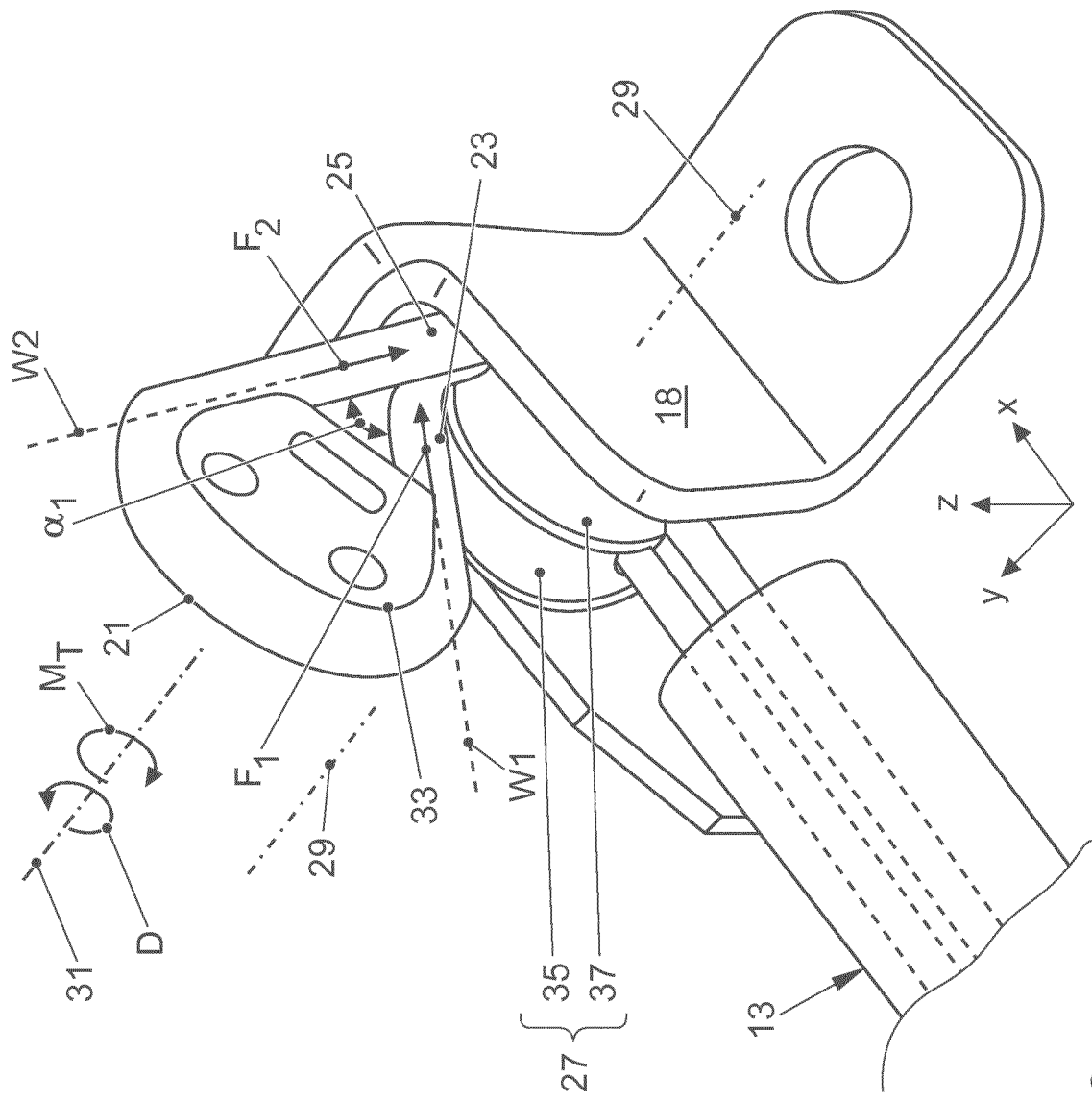
FIG. 3 is a comparative form in a perspective partial view.

As is evident from FIG. 2, the safety belt buckle 9 is attached by a wire cable 15 and by the belt force limiting unit 13 to a deflection fitting 18 that is installed on the vehicle body 17 (roughly indicated in FIG. 1). For improved understanding of the invention, to start with the structure and mode of operation of a comparative form not included by the invention are described below on the basis of FIGS. 2 and 3: Accordingly, a wire cable loop 21 that transitions into wire cable segments 23, 25 is passed through a wire cable pass-through 19 (FIG. 2) of the safety belt buckle 9. These segments are passed out of the safety belt buckle 9 and extend to a cable deflection element 27 of the deflection fitting 18, at which they are deflected about at least one deflection axis 29 in the direction toward the belt force limiting unit 13. In FIG. 2 or 3, the safety belt buckle 9 is rotated about a safety belt buckle axis 31, specifically in such a manner that the wire cable loop 21 passed through the safety belt buckle 9 is oriented with its loop opening 33 open in the axial direction with respect to the deflection axis 29. In FIG. 3 (and in FIG. 4 as well) the safety belt buckle 9 is omitted for reasons of clarity.

The wire cable segment 23 facing toward the belt force limiting unit 13 in FIG. 2 or 3 is deflected at a first cable pulley 35 of the cable deflection element 27, while the wire cable segment 25 facing away from the belt force limiting unit 13 is deflected at a second cable pulley 37 of the cable deflection element 27. The two cable pulleys 35, 37 in FIG. 3 are designed with identical outer diameters, and are arranged next to and coaxial to one another in the axial direction of the deflection axis 29.

The belt force limiting unit 13 shown in FIG. 2 is constructed as a piston-cylinder arrangement with a piston tube 39 and with a piston 41 that, in the belt force limiting event, is displaceable in the piston tube with widening and plastic deformation of said tube. The two wire cable segments 23, 25 are passed through the piston tube 39 in a double cable passage and are fastened to the piston 41, for example by a stamping or crimping. In the unused position shown in FIG. 2, the cone-like piston tip 43 of the piston 41 is in contact with an end face of the piston tube 39 facing away from the deflection fitting 18.

As is evident from FIG. 2, the safety belt buckle 9 with the wire cable loop 21 carried therein is rotated by 90° about the safety belt buckle axis 31, and specifically with reference to a safety belt buckle position in which the loop opening 33 is oriented to be open at approximately right angles to the deflection axis 29 and the wire cable segments 23, 25 extend with no twist from the safety belt buckle 9 to the cable deflection element 27.

In FIG. 2, the wire cable segments 23, 25 passed out of the safety belt buckle 9 span a loop angle α. In the belt force limiting event (which is to say in the event of a crash), the loop angle α determines the orientation of the force action lines W1, W2 (FIG. 3) that run in the wire cable segments 23, 25 and along which the tensile forces $F_1, F_2$ run. The two tensile forces $F_1, F_2$ acting in the wire cable segments 23, 25 have force components that produce a torsional moment $M_T$ that acts in opposition to the safety belt buckle rotation D about the safety belt buckle axis 31 in the belt force limiting event.

Figure 4:
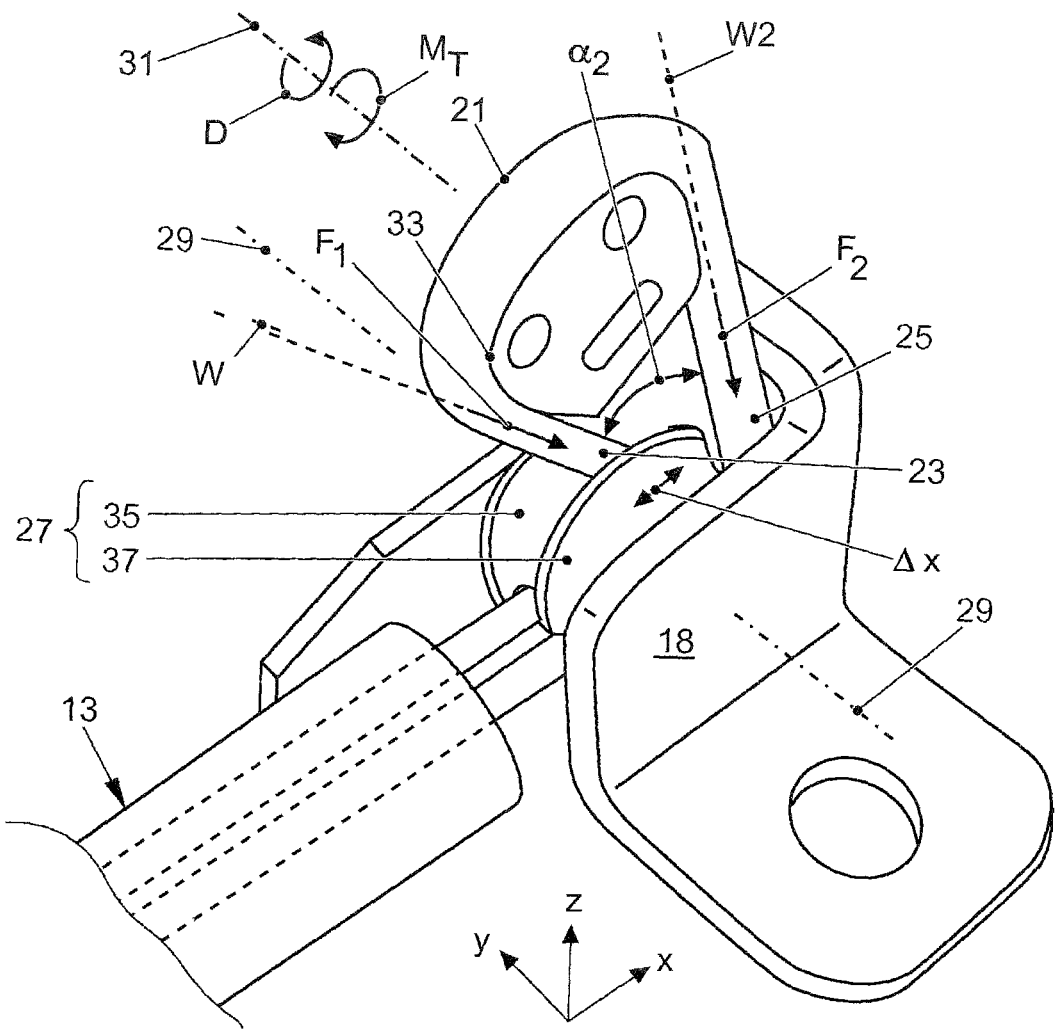
FIG. 4 is an exemplary embodiment of the invention in a view corresponding to FIG. 1.
Figure 5:
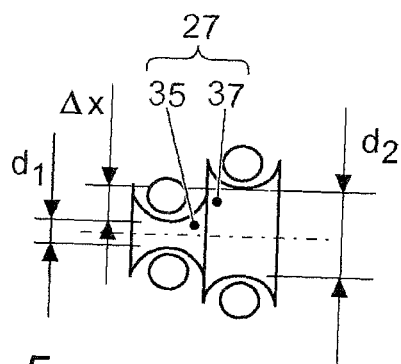
FIG. 5 is an arrangement of the two cable pulleys in the cable deflection element.
Figure 6:
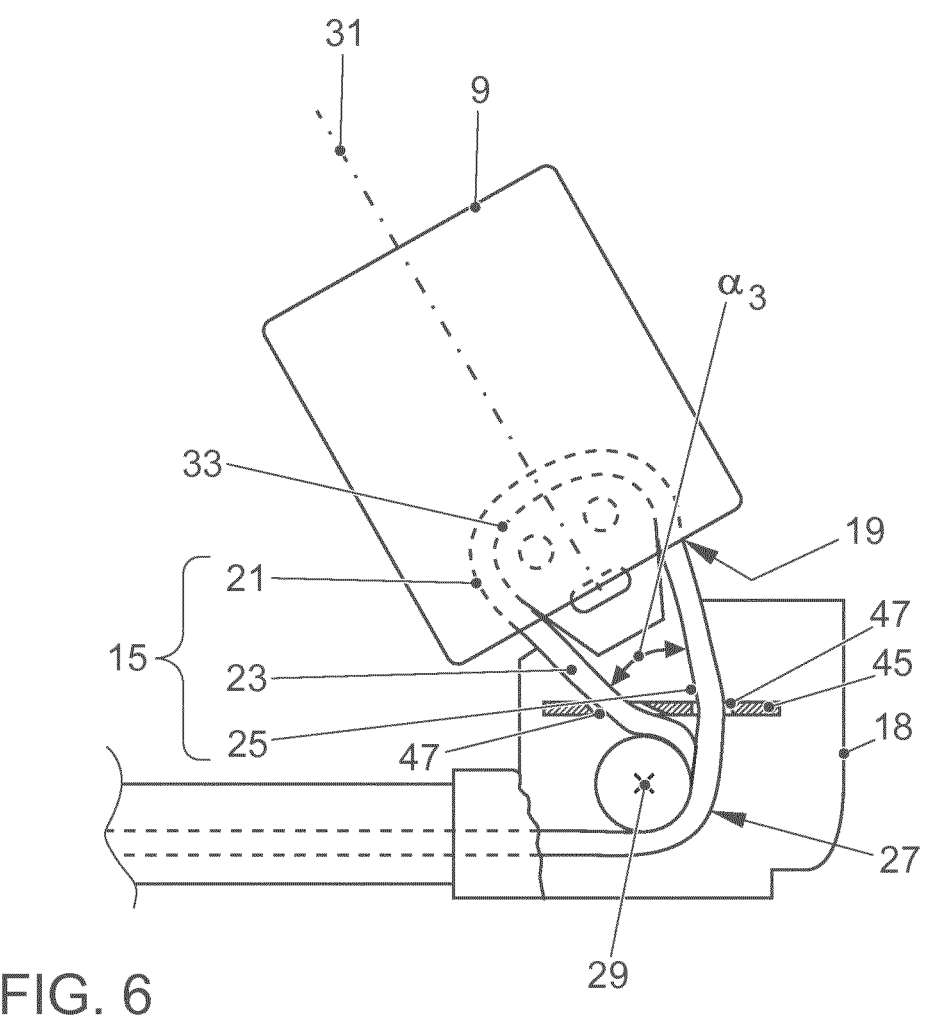
FIG. 6 is an exemplary embodiment of the invention in a perspective partial representation.

For the purpose of reducing the torsional moment $M_T$, cable pulleys 35, 37 with different dimensions are installed in the cable deflection element 27 in FIG. 4. The first cable pulley 35 for deflection of the wire cable segment 23 facing toward the belt force limiting unit 13 has an outer diameter dl that is reduced in comparison with the second cable pulley 37, as is also shown in FIG. 5. In this way, the deflection of the wire cable segment 23 facing toward the belt force limiting unit 13 is offset—with respect to the deflection of the wire cable segment 25 facing away from the belt force limiting unit 13—by an offset dimension $\Delta x$ in the direction toward the belt force limiting unit 13. This offset dimension $\Delta x$ brings about a reduced loop angle $\alpha 2$ as compared to FIG. 3. As a result, the force components of the two tensile forces F1, F2 that act in the wire cable segments 23, 25 and cause the torsional moment MT are also reduced.

In FIG. 5, an exemplary embodiment of the invention is shown that is constructed largely identically to the comparative form shown in FIG. 3 that is not included by the invention. In contrast to FIG. 3, a load-bearing cable guide 45 is additionally installed in FIG. 5. This is implemented as a guide plate that has two pass-through openings 47 offset from one another in the longitudinal vehicle direction x, through each of which is loosely passed a wire cable segment 23, 25. The two pass-through openings 47 are positioned in the load-bearing cable guide 45 such that the wire cable segment 23 facing toward the wire cable limiting unit 13 is pressed in the direction toward the belt force limiting unit 13 and at the same time the wire cable segment 25 facing away from the belt force limiting unit 13 is pressed away from the belt force limiting unit 13. In this way, the loop angle $\alpha_3$ spanned by the wire cable segments 23, 25 is increased, by which means a torsional moment $M_T$ that is reduced in comparison with FIG. 3 is produced in the belt force limiting event.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A safety belt device for a vehicle, the safety belt device comprising:
    a belt force limiting unit;
    a safety belt buckle that interacts with the belt force limiting unit; and
    a wire cable loop passed through the safety belt buckle that transitions into wire cable segments that are passed out of the safety belt buckle and extend to a cable deflection element at which the wire cable segments are deflected about at least one deflection axis in a direction toward the belt force limiting unit,
    wherein the safety belt buckle is rotated about a safety belt buckle axis such that the wire cable loop passed through the safety belt buckle is oriented with a loop opening of the safety belt buckle open in an axial direction with respect to the at least one deflection axis,
    wherein a first one of the wire cable segments that faces toward the belt force limiting unit is deflected at a first deflection contour of the cable deflection element and a second one of the wire cable segments that faces away from the belt force limiting unit is deflected at a second deflection contour of the cable deflection element,
    wherein the first and second deflection contours are offset from one another in the axial direction of the deflection axis,
    wherein, in a belt force limiting event, the wire cable segments exert on the safety belt buckle a torsional moment that acts in opposition to the safety belt buckle rotation about the safety belt buckle axis, and
    wherein, to reduce the torsional moment, the first deflection contour for deflection of the first one of the wire cable segments that faces toward the belt force limiting unit is offset with respect to the second deflection contour in the direction toward the belt force limiting unit by an offset dimension.

2. The safety belt device according to claim 1, wherein the wire cable segments passed out of the safety belt buckle extend over a free wire cable path to the cable deflection element and span a loop angle that determines the orientation of force action lines that run in the wire cable segments in the belt force limiting event, and wherein the loop angle is reduced by the first and second deflection contours that are offset by the offset dimension, namely in comparison with deflection contours arranged without an offset, and wherein through reduction of loop angle force components that act in the wire cable segments and cause the torsional moment are reduced.

3. The safety belt device according to claim 1, wherein the first deflection contour is designed as a first cable pulley and the second deflection contour is designed as a second cable pulley, wherein the first cable pulley and the second cable pulley are coaxially oriented in the axial direction.

4. The safety belt device according to claim 3, wherein the first and second cable pulleys are oriented coaxially to one another in the axial direction, and wherein the first cable pulley for deflection of the first one of the wire cable segments that faces toward the belt force limiting unit has a reduced outer diameter in comparison with the second cable pulley.

5. The safety belt device according to claim 1, wherein the safety belt buckle with the wire cable loop carried therein is rotated by 90° about the safety belt buckle axis, and with reference to a safety belt buckle position in which the loop opening is oriented to be open at approximately right angles to the deflection axis and the wire cable segments extend with no twist from the safety belt buckle to the cable deflection element.

6. The safety belt device according to claim 1, wherein the belt force limiting unit is constructed as a piston-cylinder arrangement with a piston tube and with a piston that is displaceable with widening and plastic deformation of the piston tube in the belt force limiting event, via which a safety-belt force exerted on a vehicle occupant is limited to a predefined force level.

7. A safety belt device for a vehicle, comprising:
    a belt force limiting unit;
    a safety belt buckle that interacts with the belt force limiting unit; and
    a wire cable loop passed through the safety belt buckle that transitions into wire cable segments that are passed out of the safety belt buckle and extend to a cable deflection element at which the wire cable segments are deflected about at least one deflection axis in a direction toward the belt force limiting unit,
    wherein the safety belt buckle is rotated about a safety belt buckle axis such that the wire cable loop passed through the safety belt buckle is oriented with a loop opening of the safety belt buckle open in an axial direction with respect to the at least one deflection axis, wherein at least one of the wire cable segments that faces toward the belt force limiting unit is deflected at a first deflection contour of the cable deflection element and a second one of the wire cable segments that faces away from the belt force limiting unit is deflected at a second deflection contour of the cable deflection element, wherein the first and second deflection contours are offset from one another in the axial direction of the deflection axis, and wherein, in a belt force limiting event, the wire cable segments exert on the safety belt buckle a torsional moment that acts in opposition to the safety belt buckle rotation about the safety belt buckle axis, wherein the wire cable segments passed out of the safety belt buckle extend over a wire cable path to the cable deflection element and span a loop angle that determines the orientation of force action lines that run in the wire cable segments in the belt force limiting event, wherein the cable deflection element has a load-bearing cable guide via which the first one of the wire cable segments that faces toward the belt force limiting unit presses in the direction toward the belt force limiting unit and/or the second one of the wire cable segments that faces away from the belt force limiting unit presses away from the belt force limiting unit, with a reduction of the loop angle, and wherein, through reduction of the loop angle, force components that act in the wire cable segments and cause the torsional moment are reducible.

* * * * *